Figure 1:
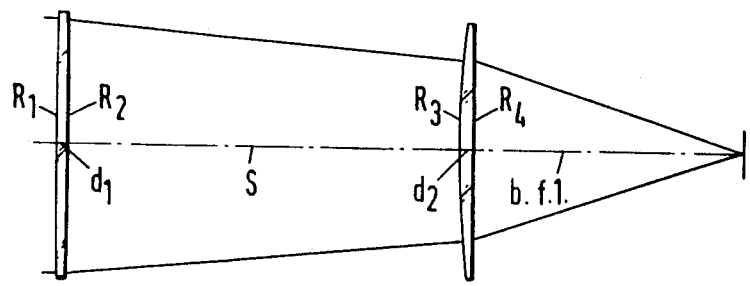

OR 3,992,078

United States
Freeman et al.

[11] 3,992,078
[45] Nov. 16, 1976

[54] LENS STRUCTURE

[75] Inventors: David Freeman, South Croydon; Brian Blandford, East Molesey, both of England

[73] Assignee: The Rank Organisation Ltd., London, England

[22] Filed: May 6, 1975

[21] Appl. No.: 574,879

[30] Foreign Application Priority Data
May 6, 1974 United Kingdom............ 19923/74

[52] U.S. Cl..................................... 350/2; 350/231
[51] Int. Cl.²........................................... G02B 3/00
[58] Field of Search.............................. 350/2, 231

[56] References Cited
UNITED STATES PATENTS
3,034,398  5/1962  Barnes et al....................... 350/2 X
3,778,133  12/1973  Tatian.................................. 350/2

Primary Examiner—John K. Corbin
Assistant Examiner—Conrad Clark
Attorney, Agent, or Firm—Brisebois & Kruger

[57] ABSTRACT

An optical objective for the infra-red wave band, comprising front and rear simple positive lens elements each made of Germanium, said elements being axially spaced by a distance S lying between 0.8F and 1.2F, the rear surfaces of said elements being plane or convex to the front with radii of curvature greater than 10F and the front surface of each element being convex to the front with a radius of curvature less than the radius of curvature of its rear surface.

13 Claims, 2 Drawing Figures

LENS STRUCTURE

FIELD OF THE INVENTION

This invention relates to an optical objective for the infra-red wave band, more especially the 8 to 14 μm wave band.

OBJECT OF THE INVENTION

Lens materials suitable for use in the infra-red wave band are in general expensive. The present invention has for its general object to provide an objective for the infra-red wave band which enables a high standard of performance to be achieved in a simple construction.

BRIEF SUMMARY OF THE INVENTION

According to the invention there is provided an optical objective for the infra-red wave band, comprising front and rear simple positive lens elements each made of Germanium, said elements being axially spaced by a distance S lying between 0.8F and 1.2F, the rear surfaces of said elements being plane or convex to the front with radii of curvature greater than 10F and the front surface of each element being convex to the front with a radius of curvature less than the radius of curvature of its rear surface.

FURTHER FEATURES OF THE INVENTION

Preferably, the successive radii $r_1$, $r_2$, $r_3$, $r_4$ of the surfaces of the lens elements lie between 5 and 15F, between 50F and $\alpha$, between 2F and 5F and between 50F and $\alpha$. The curvatures of all the surfaces are thus relatively shallow, and this facilitates minimisation of the axial thicknesses of the elements, which are preferably each less than 0.05F, enabling the complete objective to be made with a very small amount of Germanium.

Nevertheless, good chromatic imaging over the 8 to 14 μm wave band up to F/1 aperture can be achieved at one infinite conjugate, primarily due to the large fixed air separation between the elements, which preferably lies between 0.9F and 1.1F, assisted by the provision of an aspheric surface, preferably formed on the rear surface of the front element. With an infinite front conjugate the image plane is located between 0.5F and 2F to the rear of the rear element, i.e. the back focal length (b.f.l.) of the objective lies between 0.5F and 2F.

EMBODIMENTS OF THE INVENTION

Two examples of optical objective in accordance with the invention are set forth in the following tables which are applicable to the general construction shown in FIG. 1 of the accompanying drawings. In the tables, $R_1$, $R_2$ etc. designate the radii of curvature of the successive lens surfaces counting from the front, the positive sign indicating that the surface is convex to the front, $d_1$ and $d_2$ designate the axial thicknesses of the front and rear lens elements and S designates the axial separation between the elements.

Figure 2:
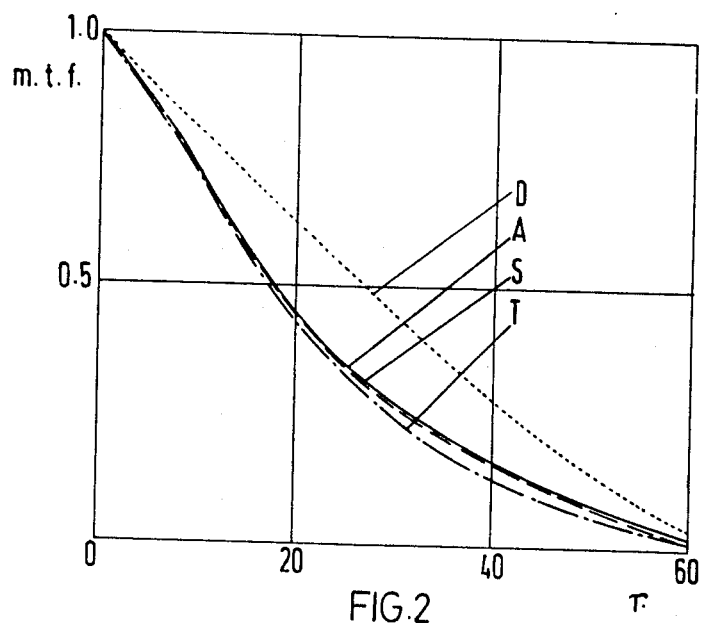

FIG. 2 is a diagram illustrating the performance of the construction of objective specified in the table for Example 2.

EXAMPLE 1

Equivalent Focal Length (F) 100

| Surface Radii | | Axial Thicknesses and Air Separations | | Materials of Lens Elements |
|---|---|---|---|---|
| $R_1$ + | 1025.64 | | | |
| $R_2$ | ∞ (aspheric) | $d_1$ S | 3.37 104.80 | Ge |
| $R_3$ + | 293.69 | | | |
| $R_4$ | ∞ | $d_2$ b.f.l. | 4.67 66.23 | Ge |

EXAMPLE 2

Equivalent Focal Length 100

| Surface Radii | | Axial Thicknesses and Air Separations | | Materials of Lens Elements |
|---|---|---|---|---|
| $R_1$ + | 666.67 | | | |
| $R_2$ + | 6666.67 (aspheric) | $D_1$ S | 3.41 104.40 | Ge |
| $R_3$ + | 277.78 | | | |
| $R_4$ + | 6666.67 | $d_2$ b.f.l. | 4.07 56.33 | Ge |

Example 1 has a relative aperture of F/1.5 over a total angular field of 8 degrees. Field coverage is 0.13F.

Example 2 has a relative aperture of F/1.0 over a total angular field of 4 degrees. Field coverage is 0.057F.

In each example the rear surface of the front element is aspherically worked. In conjunction with the substantial fixed air separation between the front and rear elements (1.048F in Example 1 and 1.044F in Example 2), the aspheric surface enables a high standard of performance to be achieved over the 8 to 14 μm infra-red wave band, as will be clear from FIG. 2, in a simple construction using a very small quantity of Germanium.

With regard to FIG. 2, it is nowadays becoming increasingly common to show the performance of an objective in terms of its "modulation transfer function (m.t.f.)", which is analogous to the frequency response of an electrical system. The m.t.f. is the ratio of the contrast in the image to that in the object for a one-dimensional sinusoidal intensity pattern (or grating) situated in the object plane. The "frequency" for which the response (r) or resolution is determined is the reciprocal of the period of the grating and in FIG. 2 is measured in lines/mm, referred to the image plane.

In FIG. 2, the curve A shows the m.t.f. for a paraxial pencil, and curves S and T respectively show the m.t.f. over the full field, respectively in sagittal and tangential section. The diffraction limit shown by curve D is the fundamental limitation on performance due to the wave nature of light and the size of the lens aperture. The curve D corresponds to the m.t.f. of an aberration free objective of the same aperture ratio.

The objective of this invention can be used either in a flat field or a curved field mode, either as a complete optical system in itself or as a component in a scanning system. A small flat field corrector may be used with the objective if desired.

I claim:

1. An optical objective for the infra-red wave band, consisting of front and rear simple positive lens elements, each made of Germanium, said elements being axially spaced by an air separation lying between 0.8F and 1.2F, where F is the equivalent focal length of the complete objective, the rear surfaces of the two elements each being plane or having minimal curvature convex to the front and the front surfaces of the front and rear elements each being convex to the front with radii of curvature greater than 5F and 2F, respectively, and less than the radii of curvature of the rear surfaces of said respective front and rear elements.

2. An objective according to claim 1, wherein the radius of the front surface of the front element lies between 5F and 15F.

3. An objective according to claim 1, wherein the radius of the front surface of the rear element lies between 2F and 5F.

4. An objective according to claim 1, wherein the radius of the rear surface of the front element is greater than 50F.

5. An objective according to claim 1, wherein the radius of the rear surface of the rear element is greater than 50F.

6. An objective according to claim 1, wherein S is approximately equal to F.

7. An objective according to claim 1, wherein the axial thicknesses of the front and rear elements are less than 0.05F.

8. An objective according to claim 1, wherein the back focal length of the objective lies between 0.5F and 2F.

9. An objective according to claim 1, wherein at least the rear surface of the front lens element is aspheric.

10. An optical objective for the infra-red wave band constructed substantially in accordance with the following table:

| Equivalent Focal Length (F) 100 | | | |
|---|---|---|---|
| Surface Radii | | Axial Thicknesses and Air Separations | Materials of Lens Elements |
| $R_1$ + | 1025.64 | $d_1$    3.37 | Ge |
| $R_2$ | ∞ (aspheric) | S    104.80 | |
| $R_3$ + | 293.69 | $d_2$    4.67 | Ge |
| $R_4$ | ∞ | b.f.l.    66.23 | |

11. An optical objective for the infra-red wave band constructed substantially in accordance with the following table:

| Equivalent Focal Length (F) 100 | | | |
|---|---|---|---|
| Surface Radii | | Axial Thicknesses and Air Separations | Materials of Lens Elements |
| $R_1$ + | 666.67 | $d_1$    3.41 | Ge |
| $R_2$ + | 6666.67 (aspheric) | S    104.40 | |
| $R_3$ + | 277.78 | $d_2$    4.07 | Ge |
| $R_4$ + | 6666.67 | b.f.l.    56.33 | |

12. An objective according to claim 11, wherein the back focal length of the objective lies between 0.5F and 2F.

13. An objective according to claim 11, wherein at least the rear surface of the front lens element is aspheric.

* * * * *